United States Patent
Kato

(10) Patent No.: US 10,776,927 B2
(45) Date of Patent: Sep. 15, 2020

(54) IMAGE PROCESSING APPARATUS, IMAGE PROCESSING METHOD, AND PROGRAM

(71) Applicant: CANON KABUSHIKI KAISHA, Tokyo (JP)

(72) Inventor: Keita Kato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 204 days.

(21) Appl. No.: 15/935,748

(22) Filed: Mar. 26, 2018

(65) Prior Publication Data
US 2018/0286054 A1 Oct. 4, 2018

(30) Foreign Application Priority Data
Mar. 31, 2017 (JP) .................. 2017-070554

(51) Int. Cl.
*H04N 19/553* (2014.01)
*G06T 7/20* (2017.01)
(Continued)

(52) U.S. Cl.
CPC ............... *G06T 7/20* (2013.01); *G06T 7/238* (2017.01); *G06T 7/97* (2017.01); *H04N 19/553* (2014.11); *G06T 2207/10016* (2013.01)

(58) Field of Classification Search
CPC . G06T 2207/10016; G06T 2207/30232; G06T 7/246; G06T 7/55; G06T 7/20; G06T 7/11; G06K 9/00771; G06K 9/00718; G06K 9/00375; H04N 5/23203; H04N 5/23219; H04N 21/47205; H04N 7/181; H04N 5/24; H04N 19/176; H04N 19/61; H04N 19/70; H04N 19/60; H04N 19/46; H04N 19/124; H04N 19/13; H04N 19/91; H04N 19/14;
(Continued)

(56) References Cited

U.S. PATENT DOCUMENTS

| | | | | |
|---|---|---|---|---|
| 7,197,074 B2 * | 3/2007 | Biswas | .................. | H04N 5/145 348/E5.066 |
| 8,004,563 B2 * | 8/2011 | Talmon | .................... | G06K 9/00 348/155 |

(Continued)

FOREIGN PATENT DOCUMENTS

JP 2011-155431 A 8/2011

OTHER PUBLICATIONS

Cizmeci et al., Occlusion Aware Motion Compensation for Video Frame Rate Up-Conversion, IASTED Inter Conf Sig & Img Proc ( SIP) 2010, Jan. 2010 [retrieved Dec. 12, 2019], 9 pages. https://www.researchgate.net/publication/202387529_Occlusion_Aware_Motion_Compensation_for_Video_Frame_Rate_Up-Conversion (Year: 2010).*

*Primary Examiner* — Andrew M Moyer
*Assistant Examiner* — Dennis Rosario
(74) *Attorney, Agent, or Firm* — Canon U.S.A., Inc. IP Division

(57) ABSTRACT

A motion information calculation unit acquires motion information between a plurality of target images. An occlusion information calculation unit generates occlusion information between the target images. An image interpolation processing unit determines priority of the motion information based on the motion information and the occlusion information, and performs predetermined image processing for the target images by using motion information that is weighted based on the priority.

16 Claims, 15 Drawing Sheets

| MOVING SOURCE COORDINATES | MOVING DESTINATION COORDINATES | PRIORITY (HIGH: 1 TO LOW: 4) |
|---|---|---|
| OCCLUSION IS ABSENT | OCCLUSION IS ABSENT | 1 |
| OCCLUSION IS ABSENT | OCCLUSION IS PRESENT | 2 |
| OCCLUSION IS PRESENT | OCCLUSION IS ABSENT | 3 |
| OCCLUSION IS PRESENT | OCCLUSION IS PRESENT | 4 |

(51) Int. Cl.
*G06T 7/00* (2017.01)
*G06T 7/238* (2017.01)

(58) Field of Classification Search
CPC .... H04N 19/159; H04N 19/51; H04N 19/117; H04N 19/137; H04N 19/513; H04N 19/172; H04N 19/192; H04N 19/553
See application file for complete search history.

(56) References Cited

U.S. PATENT DOCUMENTS

| | | | |
|---|---|---|---|
| 8,254,444 B2 * | 8/2012 | Chappalli | H04N 7/0132 375/240.09 |
| 8,817,869 B2 * | 8/2014 | Kubo | H04N 19/543 375/240 |
| 2007/0133840 A1 * | 6/2007 | Cilia | G06K 9/00369 382/103 |
| 2016/0360226 A1 * | 12/2016 | Fishwick | H04N 19/172 |

* cited by examiner

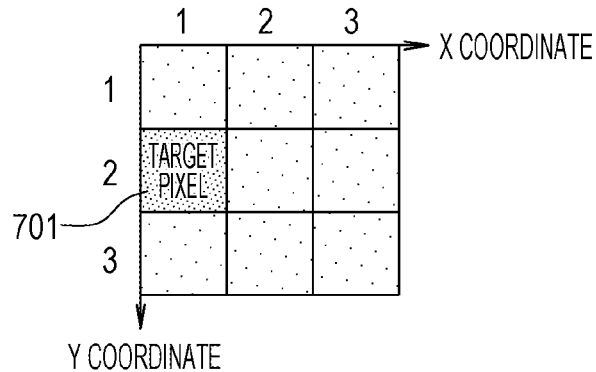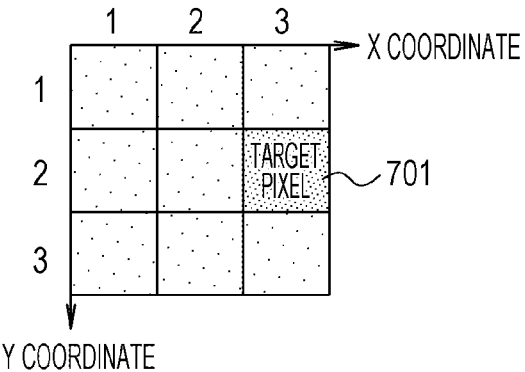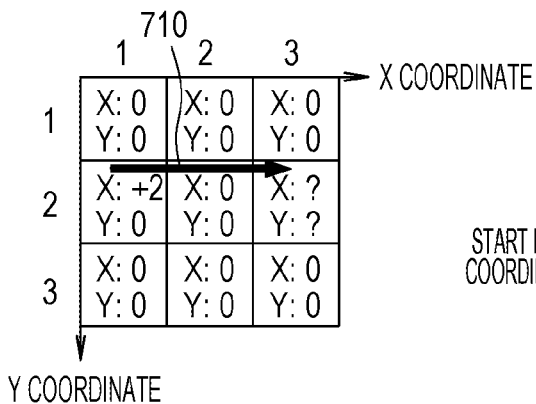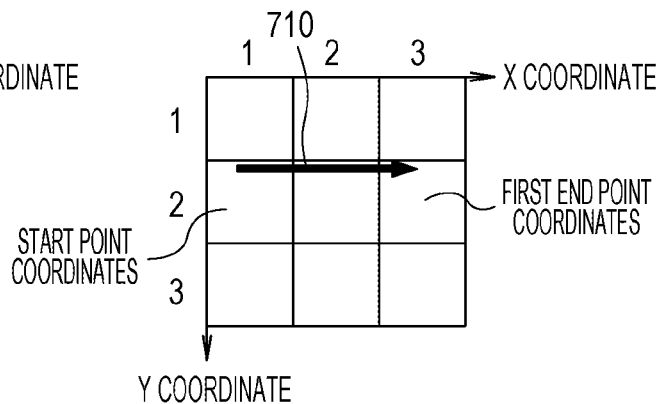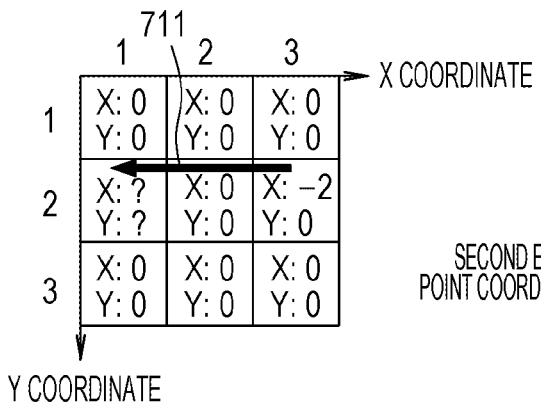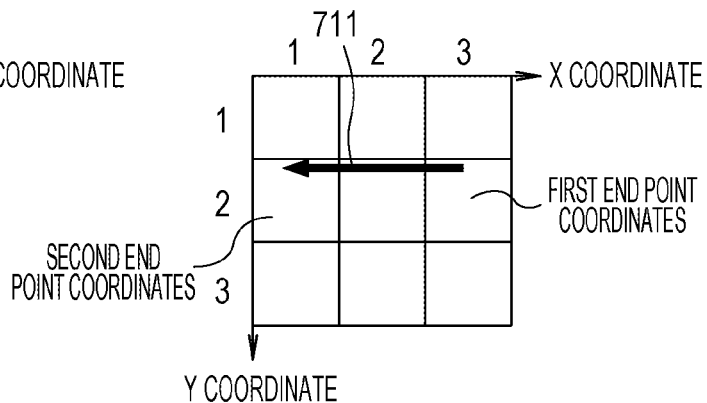

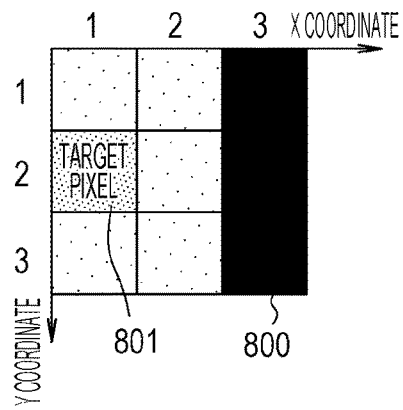
FIG. 8A
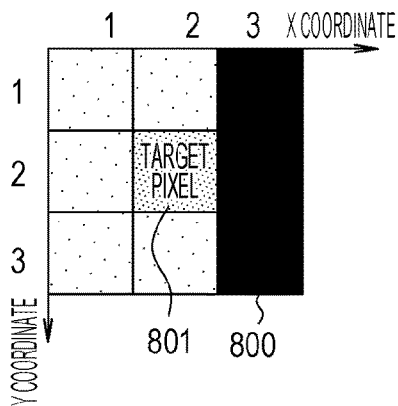
FIG. 8B
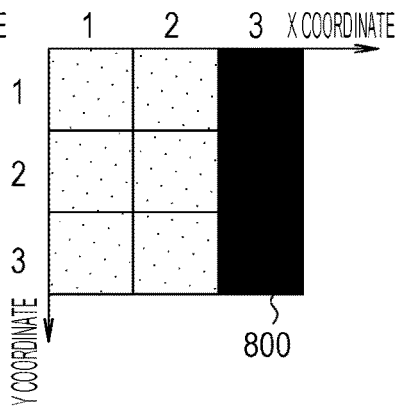
FIG. 8C
FIG. 8D
FIG. 8E
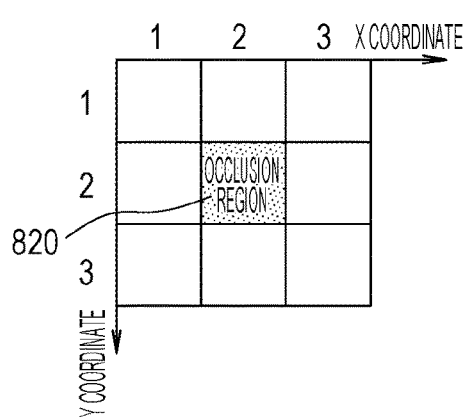
FIG. 8F
FIG. 8G

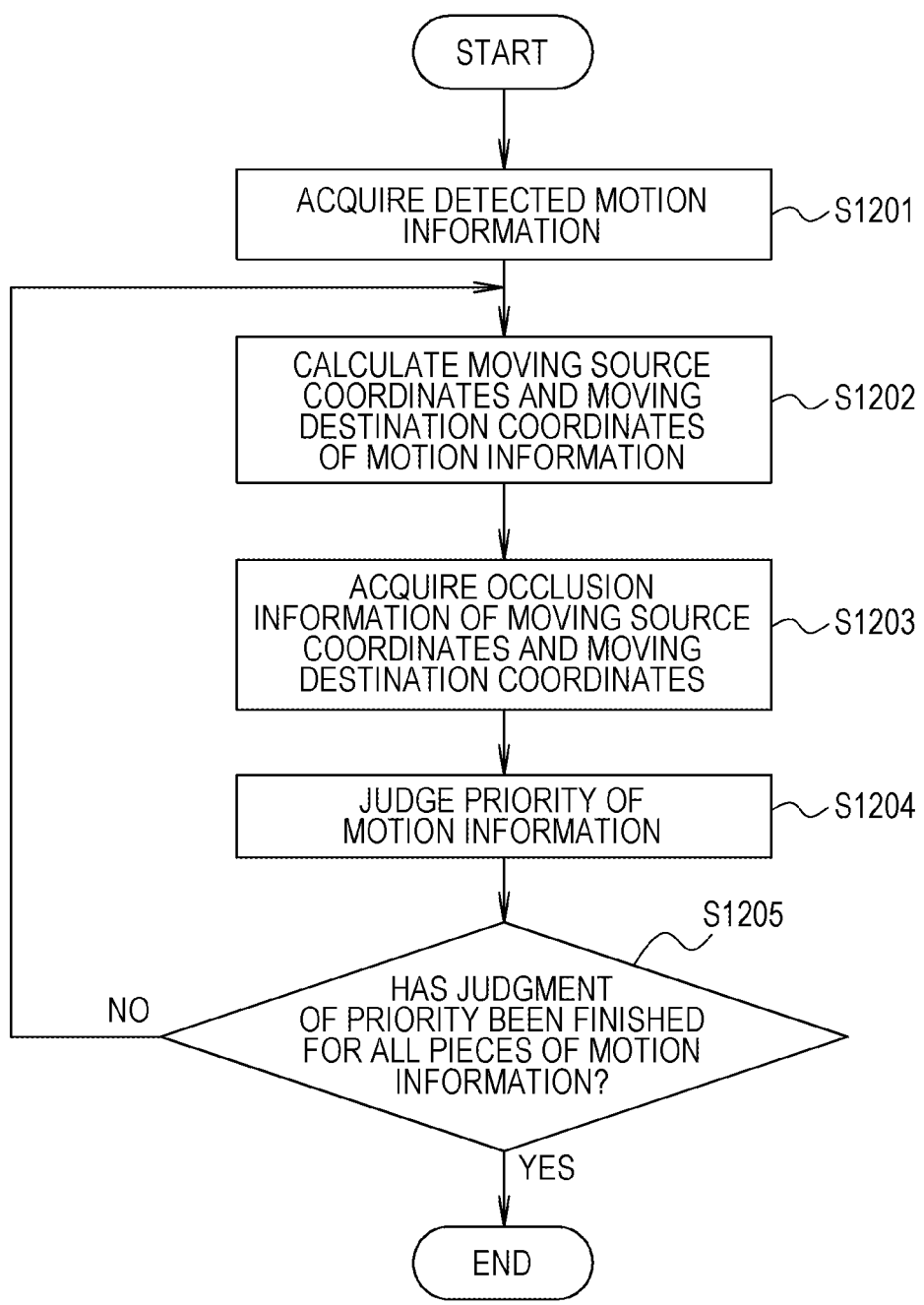

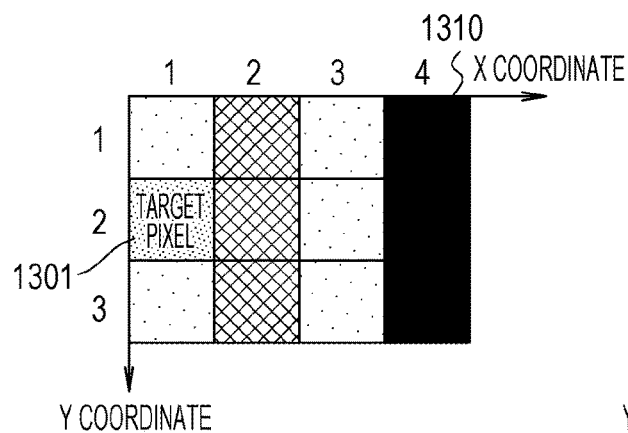
FIG. 13A
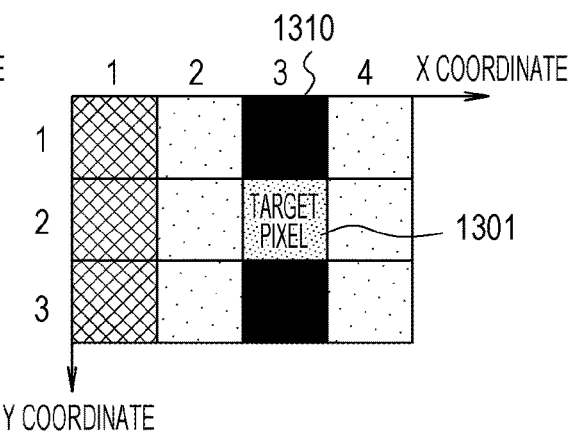
FIG. 13B
FIG. 13C
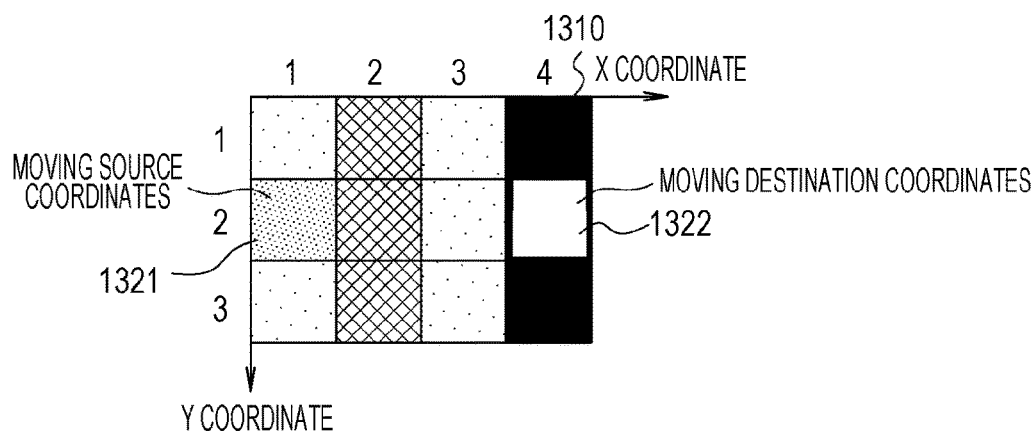
FIG. 13D

FIG. 14

| MOVING SOURCE COORDINATES | MOVING DESTINATION COORDINATES | PRIORITY (HIGH: 1 TO LOW: 4) |
|---|---|---|
| OCCLUSION IS ABSENT | OCCLUSION IS ABSENT | 1 |
| OCCLUSION IS ABSENT | OCCLUSION IS PRESENT | 2 |
| OCCLUSION IS PRESENT | OCCLUSION IS ABSENT | 3 |
| OCCLUSION IS PRESENT | OCCLUSION IS PRESENT | 4 |

# IMAGE PROCESSING APPARATUS, IMAGE PROCESSING METHOD, AND PROGRAM

BACKGROUND

Field of the Disclosure

The present disclosure relates to an image processing apparatus, an image processing method, and a program that process an image including a moving object area.

Description of the Related Art

Conventionally, an image processing apparatus that detects motion information between images which are temporally continuous and performs image processing such as generation and correction of an image by using the motion information has been known. In this case, when there is an object area of a moving object or the like in an image, the object area of the moving object crosses with another object area between images which are temporally continuous in some cases, for example. In a case where the object area of the moving object or the like crosses with another object area as described above, a plurality of pieces of motion information may be detected at a coordinate position which is set as a target of image processing. In a case where a plurality of pieces of motion information are detected at the target coordinate position, at a time of image processing, it is necessary to determine which motion information is to be used among the plurality of pieces of motion information. Note that, for example, Japanese Patent Laid-Open No. 2011-155431 discloses a technique in which depth information of each object area of an image is used to enable determination as to which motion information is to be used among a plurality of pieces of motion information.

In a case where a plurality of pieces of motion information are detected at a target coordinate position of image processing because, for example, an object area of a moving object crosses with another object area, inappropriate motion information, for example, is used and erroneous image processing is performed. Note that, in the technique disclosed in Japanese Patent Laid-Open No. 2011-155431, though motion information used for image processing is selected on the basis of depth information, in a case where depth information cannot be acquired for various reasons, such as a lack of capability of an apparatus, it is difficult to determine appropriate motion information.

SUMMARY

The invention includes: an acquisition unit configured to acquire motion information between a plurality of target images; a generation unit configured to generate occlusion information between the target images; a determination unit configured to determine priority of the motion information based on the motion information and the occlusion information; and a processing unit configured to perform predetermined image processing for the target images by using motion information that is weighted based on the priority.

Further features of the present invention will become apparent from the following description of exemplary embodiments with reference to the attached drawings.

BRIEF DESCRIPTION OF THE DRAWINGS

FIGS. 7A to 7F illustrate views for explaining a standard image and a reference image and forward and backward motion information.

FIGS. 8A to 8G illustrate views for explaining motion information estimation processing of an occlusion region.

FIG. 12 is a flowchart of priority calculation processing of motion information.

FIGS. 13A to 13D illustrate views for explaining calculation processing of moving source coordinates and moving destination coordinates of motion information.

FIG. 14 illustrates an example of a table of correspondence between the moving source coordinates and the moving destination coordinates and priority.

DESCRIPTION OF THE EMBODIMENTS

Hereinafter, exemplary embodiments of the invention will be described in detail with reference to drawings.

In the present exemplary embodiment, an example in which motion information is detected between images that are continuous (for example, adjacent) on a time axis and an interpolation image is generated by using the motion information is taken as an example of image processing. In the present exemplary embodiment, a case where there is an object area of a moving object or the like in an image and, for example, object areas cross with each other between images that are continuous on the time axis will be described as an example.

Figure 1:
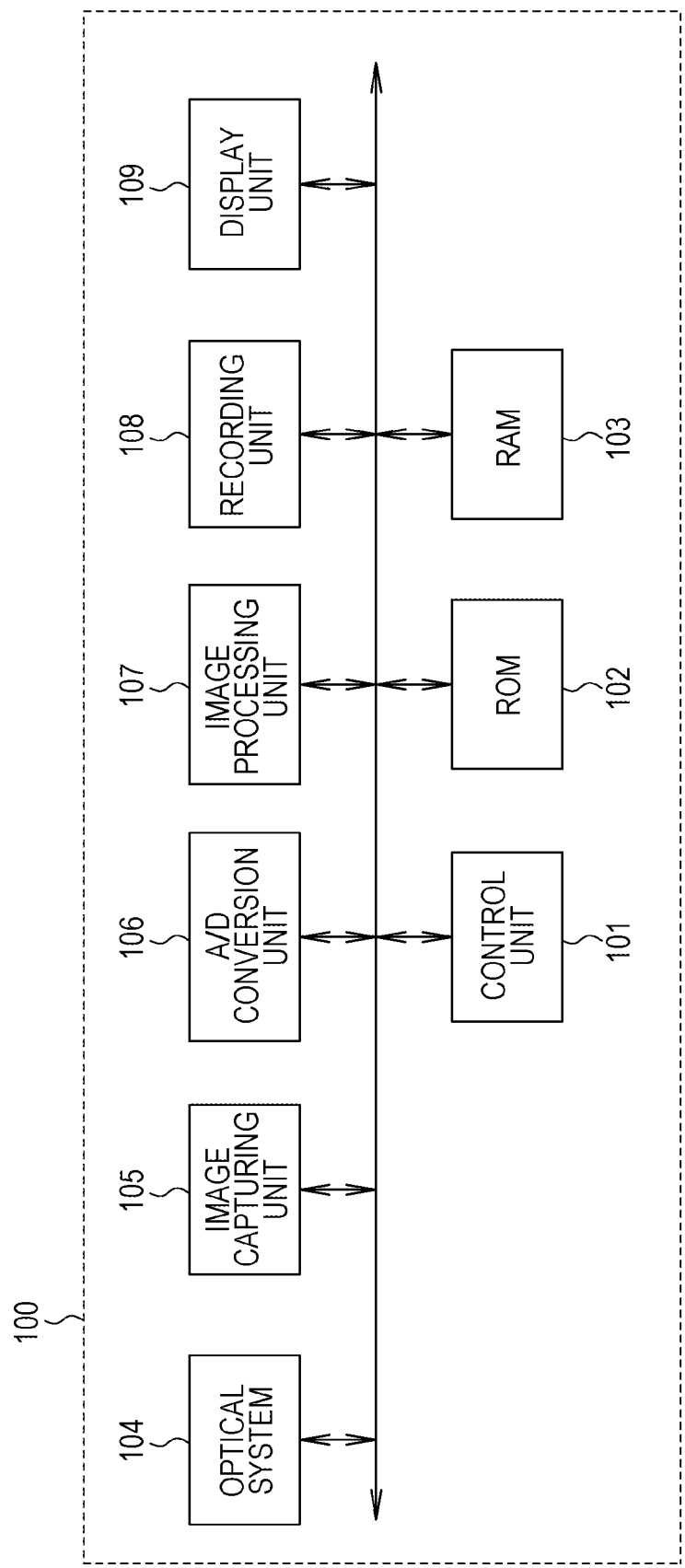
FIG. 1 illustrates a schematic configuration of an image processing apparatus (image capturing apparatus) of the present exemplary embodiment.

FIG. 1 illustrates an example of a schematic configuration of an image capturing apparatus 100 as an application example of an image processing apparatus of the present exemplary embodiment. Note that, the image capturing apparatus 100 in the present exemplary embodiment is able to be applied to any of a digital camera, a digital video camera, various mobile terminals such as a smartphone and a tablet terminal which have a camera function, an industrial camera, a vehicle-mounted camera, and a medical camera, for example.

A control unit 101 is a CPU, for example, and reads out an operation program, which controls an operation of the image capturing apparatus 100, from a ROM 102 described below, develops the operation program in a RAM 103 described below for execution, and controls an operation of each unit included in the image capturing apparatus 100. The ROM 102 is an electrically erasable and recordable non-volatile memory and stores, for example, a parameter that is necessary for an operation of each unit in addition to the above-described operation program. The RAM 103 is a rewritable volatile memory and used as a storage area in which data output from each unit in the operation of each unit included in the image capturing apparatus 100 is temporarily stored.

An optical system 104 is constituted by a lens group including a zoom lens, a focus lens, and the like and forms an optical image of an object or the like on an imaging plane of an image capturing unit 105 described below. The image capturing unit 105 is an imaging sensor, such as a CCD or a CMOS sensor, and photoelectrically converts the optical image formed on the imaging plane by the optical system 104 and outputs an analog image signal that is obtained to an A/D conversion unit 106. The A/D conversion unit 106 converts the input analog image signal into digital image data and outputs the obtained digital image data to the RAM 103.

An image processing unit 107 applies various image processing, such as white balance adjustment, color interpolation, and gamma processing, to the image data stored in the RAM 103. In the case of the present exemplary embodiment, the image processing unit 107 has an interpolation image generation unit 200 illustrated in FIG. 2 and the interpolation image generation unit 200 generates an interpolation image on the basis of the image data stored in the RAM 103. A configuration and an operation of the interpolation image generation unit 200 will be described later in detail.

A recording unit 108 has a detachable memory card or the like. Upon supply of image data processed by the image processing unit 107 via the RAM 103, the recording unit 108 records the image data as recorded image data. The recording unit 108 is also able to read out the image data that is recorded and output the image data to the image processing unit 107 via the RAM 103. A display unit 109 is a display device such as an LCD (liquid crystal display). The display unit 109 displays an image based on the image data recorded in the RAM 103 or the recording unit 108, an operation user interface image for receiving an instruction from a user, or the like.

Figure 2:
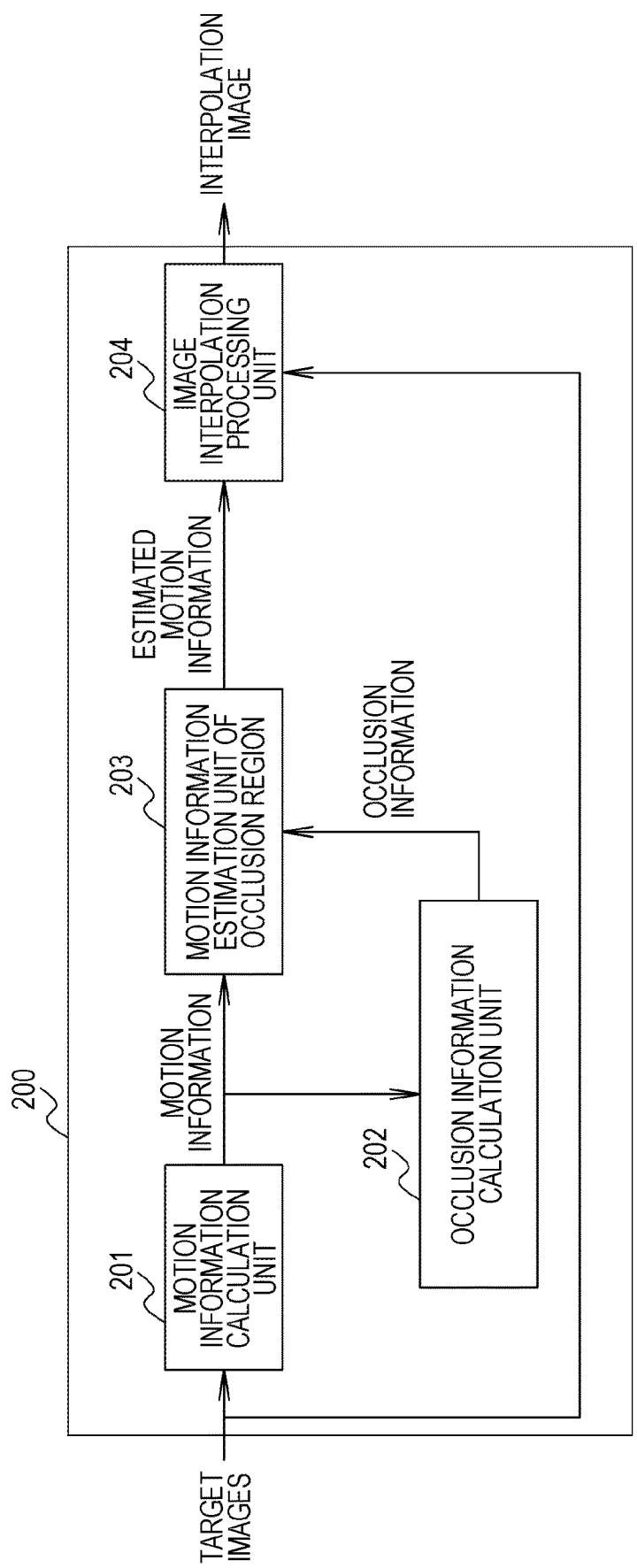
FIG. 2 illustrates a schematic configuration of an interpolation image generation unit.

FIG. 2 illustrates an example of the configuration of the interpolation image generation unit 200 included in the image processing unit 107. The interpolation image generation unit 200 generates an interpolation image by using the image data recorded in the recording unit 108, for example. In the case of the present exemplary embodiment, the interpolation image generation unit 200 uses images that are continuous on the time axis as target images of processing to detect motion information between the target images, further calculates priority of the motion information, and generates an interpolation image by using the motion information that is weighted on the basis of the priority. The interpolation image generation unit 200 is constituted by including a motion information calculation unit 201, an occlusion information calculation unit 202, a motion information estimation unit 203, and an image interpolation processing unit 204 as illustrated in FIG. 2.

Figure 3:
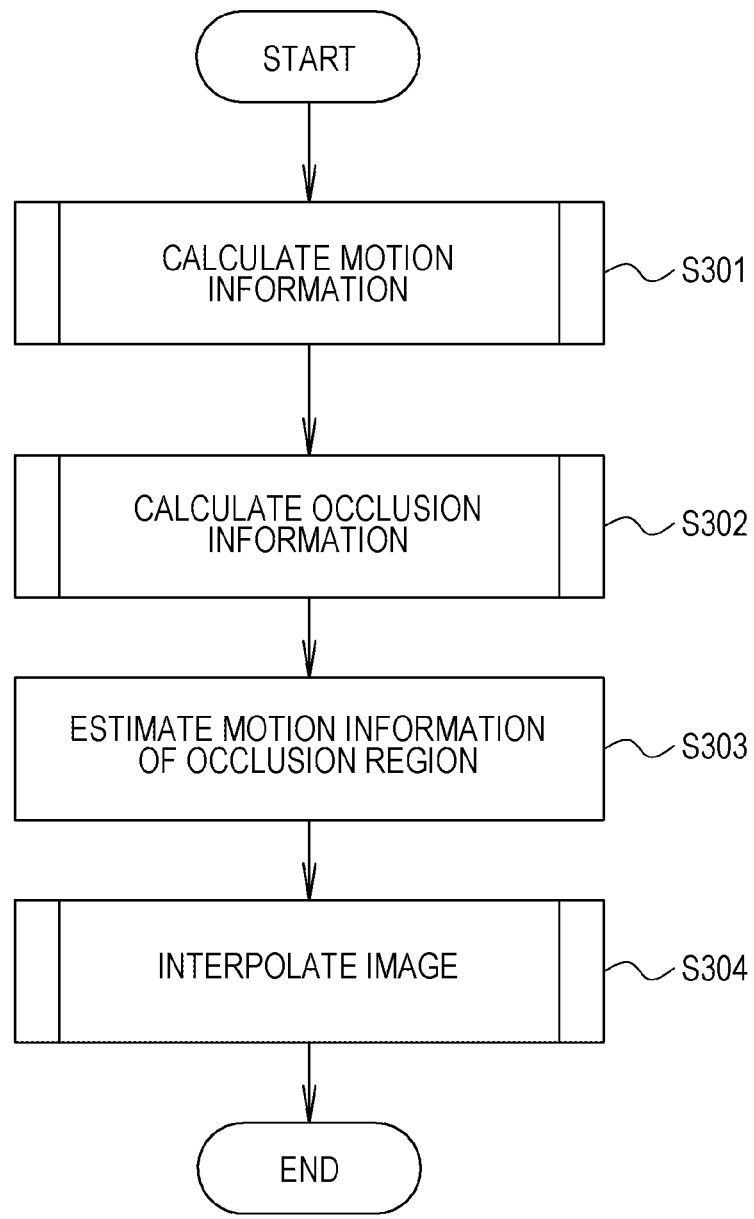
FIG. 3 is a flowchart indicating an entire flow of interpolation image generation processing.

FIG. 3 is a flowchart of interpolation image generation processing performed at the interpolation image generation unit 200. An operation of each unit of the interpolation image generation unit 200 illustrated in FIG. 2 will be described below with reference to the flowchart of FIG. 3. Note that, processing steps S301 to S304 are respectively abbreviated as S301 to S304 in the flowchart of FIG. 3. Processing of the flowchart of FIG. 3 may be performed by a hardware configuration or realized by a CPU executing a program of the interpolation image generation processing of the present exemplary embodiment. Note that, the program of the interpolation image generation processing is able to be executed by the CPU when the program is supplied via various recording media or a network and developed onto a RAM. Moreover, the interpolation image generation processing may be realized in such a manner that a part of the interpolation image generation processing is realized by a software configuration and the other part is realized by the hardware configuration. The same is applied in other flowcharts described later. The interpolation image generation processing in the present exemplary embodiment includes motion information calculation processing of S301, occlusion information calculation processing of S302, motion information estimation processing of S303, and image interpolation processing of S304.

<Motion Information Calculation Processing>

The processing of S301 of FIG. 3 is performed at the motion information calculation unit 201. At S301, images that are continuous (adjacent) on the time axis among frame images of, for example, a motion image recorded in the recording unit 108 are input as target images of the processing, and the motion information calculation unit 201 calculates motion information between the target images. As described later in detail, the motion information calculation unit 201 calculates first motion information with the target image which is the former on the time axis as a standard image and with the target image which is the latter as a reference image, and calculates second motion information with the target image which is the latter on the time axis as a standard image and with the target image which is the former as a reference image. Hereinafter, in the present exemplary embodiment, the first motion information that is calculated with the former target image on the time axis as the standard image and with the latter target image as the reference image is referred to as forward motion information. On the other hand, the second motion information that is calculated with the latter target image on the time axis as the standard image and with the former target image as the reference image is referred to as backward motion information. Then, the motion information calculation unit 201 outputs the calculated forward motion information and backward motion information to the occlusion information calculation unit 202 and the motion information estimation unit 203.

Figure 4:
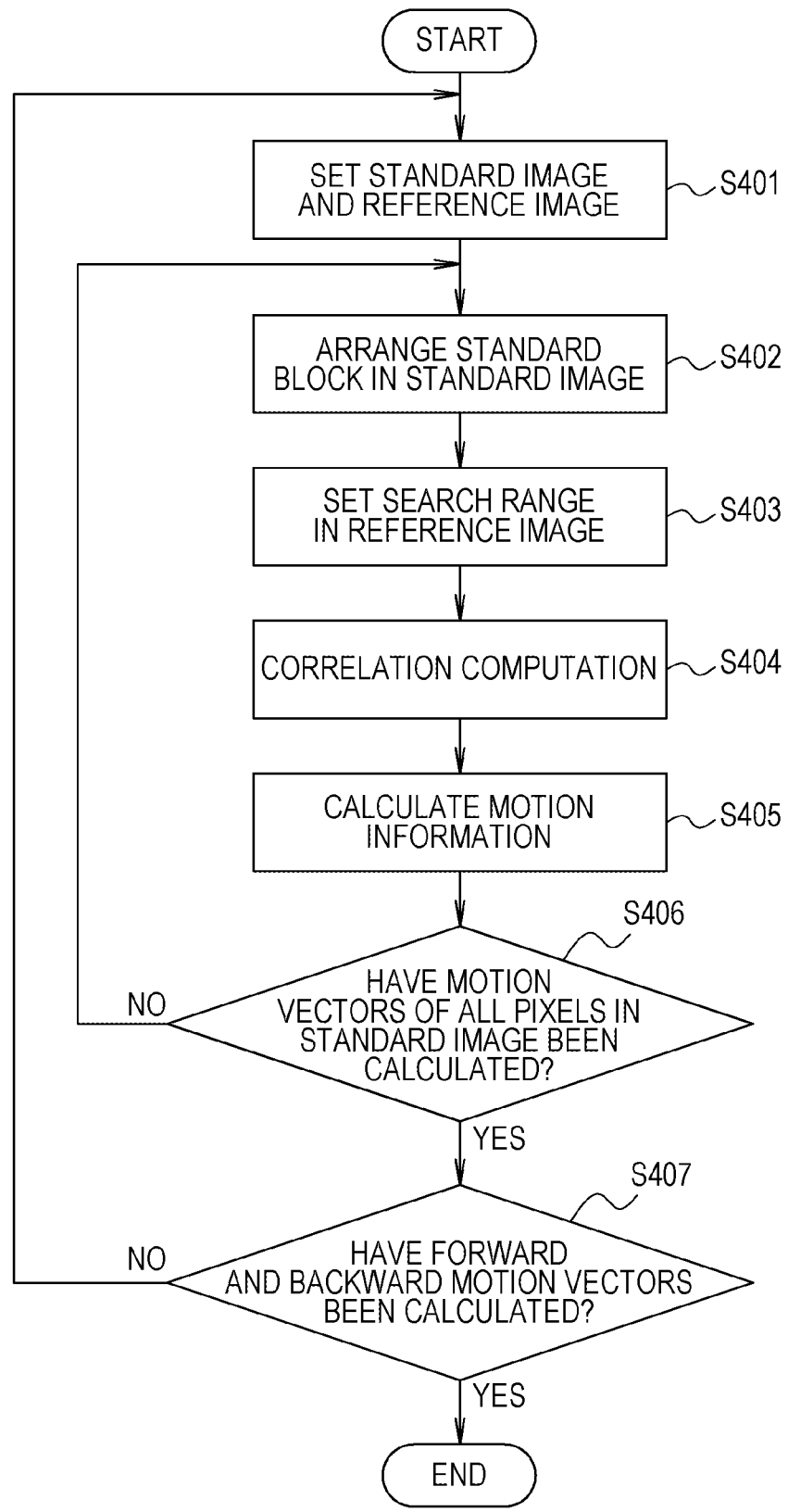
FIG. 4 is a flowchart of motion information calculation processing.
Figure 5:
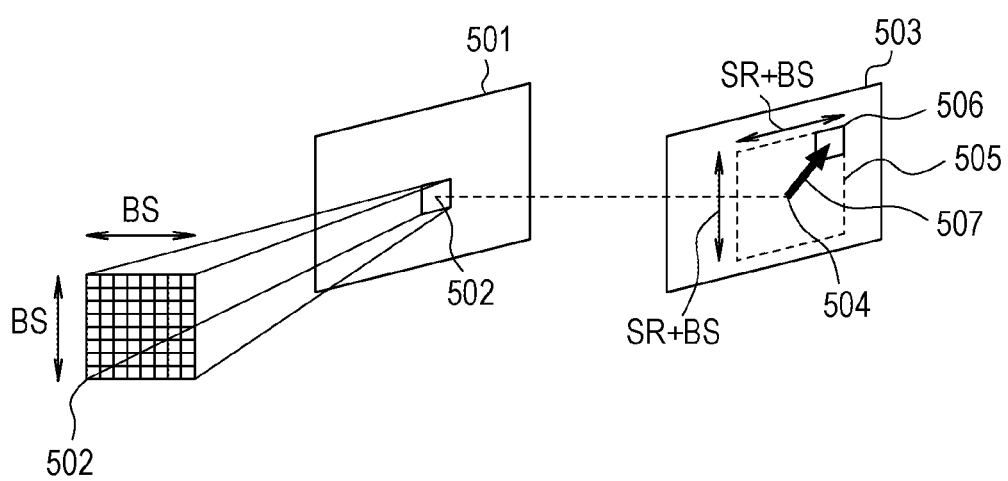
FIG. 5 illustrates a view for explaining the motion information calculation processing.

Hereinafter, motion information calculation processing that is performed by the motion information calculation unit 201 at S301 of FIG. 3 will be described in detail by using FIG. 4 and FIG. 5. FIG. 4 is a detailed flowchart of the motion information calculation processing performed by the motion information calculation unit 201 at S301 of FIG. 3, and FIG. 5 illustrates a view for explaining the motion information calculation processing, for example, performed by a block matching method. Note that, although description will be given in the present exemplary embodiment by taking the block matching method as an example of the motion information calculation processing, the motion information calculation processing is not limited to the example and motion information may be calculated by, for example, a method known as an optical flow method or the like.

As processing at S401 of FIG. 4, the motion information calculation unit 201 acquires, from image data recorded in the recording unit 108, data of two target images that are continuous (adjacent) on the time axis. At a time of calculating the forward motion information, the motion information calculation unit 201 sets the target image which is, on the time axis, the former of the two target images to be a standard image and sets the target image which is the latter on the time axis to be a reference image. Moreover, at a time of calculating the backward motion information, the motion information calculation unit 201 sets the image which is the temporally latter to be a standard image and the image which is the temporally former to be a reference image.

Next, as processing at S402, the motion information calculation unit 201 sets a standard block 502 with respect to a standard image 501 as illustrated in FIG. 5. The standard block 502 is a block whose pixel numbers in a vertical direction and a horizontal direction are both BS. Further, as processing at S403, the motion information calculation unit 201 sets a search range 505 with respect to a reference image 503. The search range 505 is a range which is in the reference image 503 and whose pixel numbers in the vertical direction and the horizontal direction with a coordinate position 504 same as that of the standard block 502 of the standard image 501 as the center are both (SR+BS). Note that, in the case of calculating the forward motion information, the standard image 501 is the temporally former image and the reference image 503 is the temporally latter image, and, on the other hand, in the case of calculating the backward motion information, the standard image 501 is the temporally latter image and the reference image 503 is the temporally former image.

Next, as processing at S404, the motion information calculation unit 201 sequentially sets reference blocks 506 in the search range 505 of the reference image 503 in a predetermined scanning order and performs correlation computation between each of the reference blocks 506 in the scanning order and the standard block 502 of the standard image 501. The reference block 506 is a block whose pixel numbers in the vertical direction and the horizontal direction are both BS similarly to those of the standard block 502. The correlation computation is computation for obtaining a difference absolute value sum of each of pixel values in the standard block 502 and each of pixel values in the reference block 506. At S404, the motion information calculation unit 201 acquires, as a coordinate position having a highest correlation value, a coordinate position of the reference block 506 whose value of the difference absolute value sum is the smallest in the search range 505. In the example of FIG. 5, an example in which a correlation value is the highest at a coordinate position of the reference block 506 which is in the search range 505 set in the reference image 503 and illustrated in the figure is illustrated. Note that, a calculation method of the correlation value is not limited to the example of obtaining the difference absolute value sum, and the correlation value may be calculated on the basis of, for example, a difference square sum or a normalized cross-correlation value.

Thereafter, as processing at S405, the motion information calculation unit 201 calculates motion information 507 on the basis of the coordinate position of the standard block 502 and the coordinate position of the reference block 506 that indicates the highest correlation value. Note that, each of the coordinate position of the standard block 502 and the coordinate position of the reference block 506 is obtained from a coordinate position of the center of each block. In the example of FIG. 5, a motion vector that indicates, in the reference image 503, a vector from a coordinate position 504 same as the coordinate position of the center of the standard block 502 of the standard image 501 to the coordinate position of the center of the reference block 506 in which the highest correlation value has been obtained at S404 is calculated as the motion information 507.

Next, as processing at S406, the motion information calculation unit 201 judges, for all pixels in the standard image 501 of FIG. 5, whether or not calculation processing of motion information (motion vector) has been finished, and, in the case of judging that calculation of motion information of all the pixels has not been finished (No), the procedure is returned to the processing of S402. In a case where the procedure is returned to the processing of S402, the motion information calculation unit 201 sets the standard block 502 again at a coordinate position that is obtained by moving the coordinate position of the standard block 502 of FIG. 5 in a predetermined scanning direction by an amount of one pixel, and thereafter the processing from S403 to S406 is performed. In this manner, the motion information calculation unit 201 iterates the processing from S402 to S406 while sequentially moving the position of the standard block 502, until calculation processing of motion information (motion vectors) corresponding to all the pixels in the standard image 501 is finished. Then, in the case of judging at S406 that calculation of motion information for all the pixels has been finished (Yes), the motion information calculation unit 201 moves to processing at S407. Note that, the motion information calculation unit 201 may not calculate motion information of all the pixels but may calculate motion information for each predetermined pixel.

Next, at S407, the motion information calculation unit 201 judges whether or not calculation processing of both forward motion information and backward motion information has been finished, and, in the case of judging that the calculation processing of the forward and backward motion information has not been finished (No), the procedure is returned to the processing of S401. Thereafter, the processing from S401 to S407 is iterated until it is judged at S407 that the calculation processing of both the forward motion information and the backward motion information has been finished. Then, in a case where it is judged at S407 that the calculation processing of the forward and backward motion information has been finished (Yes), the motion information calculation unit 201 ends the processing of the flowchart of FIG. 4. By the processing of the flowchart of FIG. 4, which has been described above, the forward and backward motion information between images of the standard image 501 and the reference image 503 that are illustrated in FIG. 5 is calculated for each of the pixels. The forward and backward motion information for each of the pixels is sent to the RAM 103 and temporarily stored therein.

<Occlusion Information Calculation Processing>

Description is returned to the flowchart of FIG. 3.

Processing at S302 of FIG. 3 is performed by the occlusion information calculation unit 202. At S302, the occlusion information calculation unit 202 generates occlusion information between the target images (the standard image 501 and the reference image 503) for each pixel by using the forward motion information and the backward motion information that are stored in the RAM 103. In the case of the present exemplary embodiment, occlusion means a state in which, for example, when an object such as a moving object crosses with another object, an object on a back side is hidden by an object on a front side. Therefore, the occlusion information in the present exemplary embodiment is information that indicates whether or not occlusion is caused, that is, whether occlusion is present or absent in each pixel of a target image.

Figure 6:
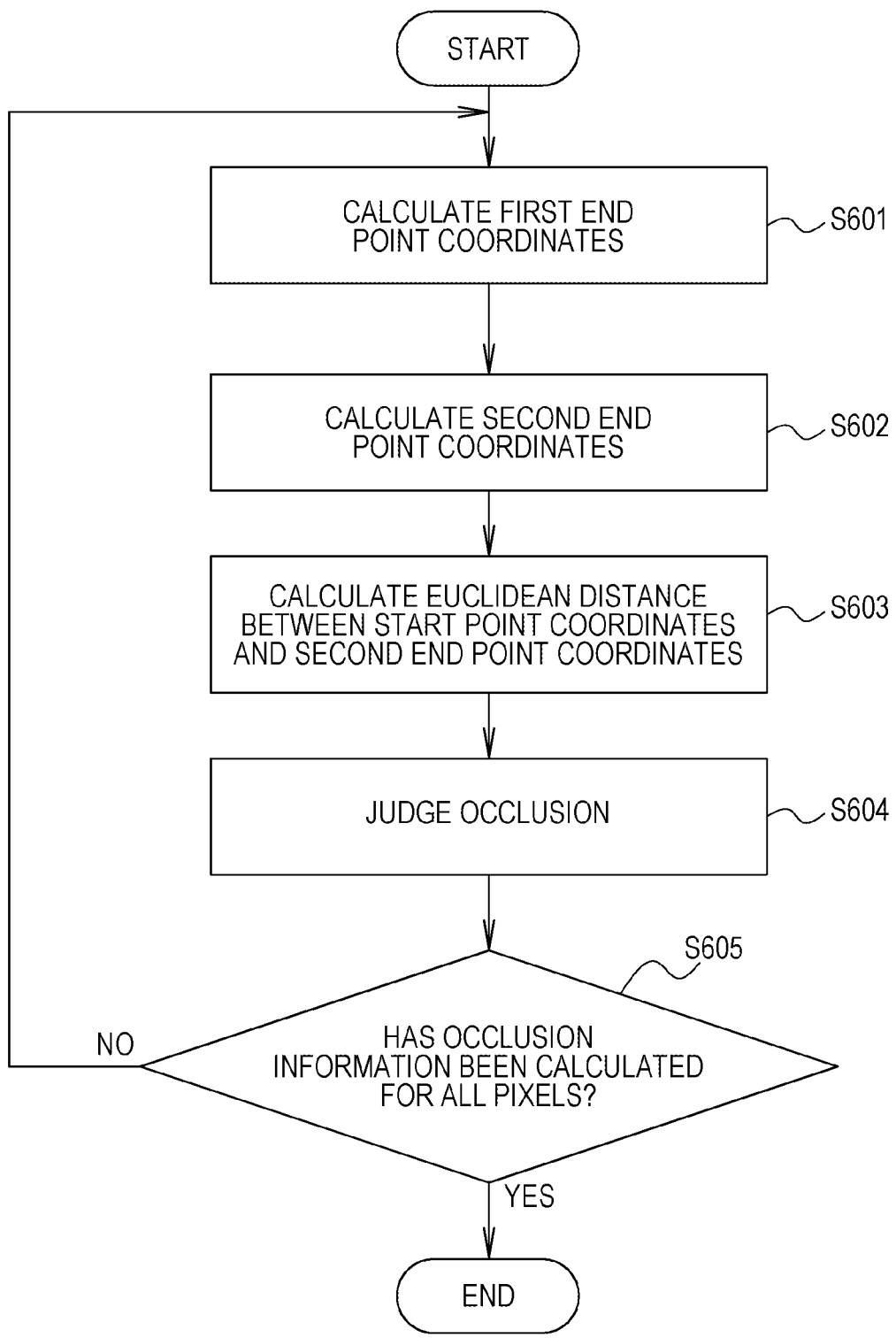
FIG. 6 is a flowchart of occlusion information calculation processing.

Hereinafter, occlusion information calculation processing performed by the occlusion information calculation unit 202 at S302 of FIG. 3 will be described in detail by using FIG. 6 and FIGS. 7A to 7F. FIG. 6 is a detailed flowchart of the occlusion information calculation processing performed by the occlusion information calculation unit 202 at S302 of FIG. 3, and FIGS. 7A to 7F are views used for explaining processing at S601 and S602 of FIG. 6.

FIG. 7A is a view illustrating a part of, e.g., Nth target image (hereinafter, referred to as an N image) which is a target of the occlusion information calculation processing among a plurality of frame images that are continuous on a time axis of a motion image, for example. FIG. 7B is a view illustrating a part of an (N+1)th target image (hereinafter, referred to as an N+1 image) which is an image after the N image. Moreover, it is assumed that, in the N image illustrated in FIG. 7A, a pixel (hereinafter, referred to as a target pixel 701) which is a target of the occlusion information calculation processing is, for example, a pixel of coordinates (X, Y)=(1, 2). In addition, it is assumed that the target pixel 701 in the N image of FIG. 7A moves to a position of, for example, coordinates (X, Y)=(3, 2) in the next N+1 image.

FIG. 7C illustrates an example of forward motion information 710 that is calculated for the target pixel 701 of FIG. 7A by setting the N image illustrated in FIG. 7A as a standard image and the N+1 image illustrated in FIG. 7B as a reference image. Moreover, FIG. 7D illustrates start point coordinates and end point coordinates (hereinafter, referred to as first end point coordinates) that indicate the forward motion information 710 calculated in the example of FIG. 7C. As illustrated in FIG. 7C, in the forward motion information 710 at the target pixel 701 of FIG. 7A, X: +2 and Y: 0 which indicate by an amount of two pixels in a rightward direction from the start point coordinates (1, 2) are provided. That is, as illustrated in FIG. 7C, the forward motion information 710 at the target pixel 701 of FIG. 7A indicates X: +2 and Y: 0, so that (X, Y)=(3, 2) is calculated for the first end point coordinates of the forward motion information 710 as illustrated in FIG. 7D.

On the other hand, FIG. 7E illustrates an example of backward motion information 711 that is calculated for the target pixel 701 of FIG. 7B by setting the N+1 image illustrated in FIG. 7B as a standard image and the N image illustrated in FIG. 7A as a reference image. Moreover, FIG. 7F illustrates start point coordinates (that is, the first end point coordinates) and end point coordinates (hereinafter, referred to as second end point coordinates) that indicate the backward motion information 711 calculated in the example of FIG. 7E. As illustrated in FIG. 7E, in the backward motion information 711 at the target pixel 701 of FIG. 7B, X: −2 and Y: 0 which indicate movement by an amount of two pixels in a leftward direction from the start point coordinates that are the first end point coordinates (3, 2) are provided. That is, as illustrated in FIG. 7E, the backward motion information 711 at the target pixel 701 of FIG. 7B indicates X: −2 and Y: 0, so that (X, Y)=(1, 2) is calculated for the second end point coordinates of the backward motion information 711 as illustrated in FIG. 7F.

The processing at S601 and S602 of FIG. 6 will be described by using the above-described example of FIG. 7A to FIG. 7F.

At S601 of FIG. 6, by using the forward motion information stored in the RAM 103, the occlusion information calculation unit 202 calculates, as the first end point coordinates, end point coordinates that are indicated by the forward motion information 710 at the target pixel 701 of FIG. 7A. In the case of the above-described example of FIG. 7C and FIG. 7D, coordinates (3, 2) are calculated as the first end point coordinates on the basis of X: +2 and Y: 0 of the forward motion information 710, which correspond to the start point coordinates (1, 2) of the target pixel 701 of FIG. 7A.

At next S602, by using the backward motion information 711 stored in the RAM 103, the occlusion information calculation unit 202 calculates, as the second end point coordinates, end point coordinates that are indicated by the backward motion information 711 at the target pixel 701 of FIG. 7B. In the case of the above-described example of FIG. 7E and FIG. 7F, coordinates (1, 2) are calculated as the second end point coordinates on the basis of X: −2 and Y: 0 of the backward motion information 711, which correspond to the start point coordinates of the target pixel 701 of FIG. 7B, that is, the first end point coordinates (3, 2).

Next, as processing at S603, the occlusion information calculation unit 202 calculates a distance between a start point coordinate position (that is, a coordinate position corresponding to the target pixel 701 of FIG. 7A) in the forward motion information 710 and a second end point coordinate position in the backward motion information 711. Specifically, the occlusion information calculation unit 202 calculates a Euclidean distance between the start point coordinate position in the forward motion information 710 and the second end point coordinate position in the backward motion information 711.

Next, at S604, the occlusion information calculation unit 202 compares the distance between the coordinate positions, which has been calculated at S603, and a predetermined threshold. In a case where the distance between the coordinate positions is equal to or more than the predetermined threshold, the occlusion information calculation unit 202 judges that the target pixel 701 of FIG. 7A is a pixel in which occlusion is present. That is, in a case where occlusion is not caused, it is possible to detect the forward motion information with high accuracy and to detect also the backward motion information with high accuracy, so that the second end point coordinate position of the backward motion information is to be coincident with or proximate to the start point coordinate position of the forward motion information. On the other hand, in a case where occlusion is caused, the forward motion information is not detected correctly, so that a first end point coordinate position is not calculated correctly, and thereby a start point coordinate position of the backward motion information is also an incorrect position. Therefore, in the case where occlusion is caused, the second end point coordinate position that is the end point coordinate position of the backward motion information is a position which is greatly different from the start point coordinate position of the forward motion information and the distance between the coordinate positions becomes long. Accordingly, in the case where the distance between the coordinate positions, which has been calculated at S603, is equal to or more than the predetermined threshold, the occlusion information calculation unit 202 judges that the target pixel 701 of FIG. 7A is a pixel in which occlusion is present. On the other hand, in a case where the distance between the coordinate positions is less than the predetermined threshold, the occlusion information calculation unit 202 judges that the target pixel 701 of FIG. 7A is a pixel in which occlusion is absent. In this manner, the occlusion information calculation unit 202 judges at S604 whether the target pixel 701 is a pixel in which occlusion is caused (occlusion is present) or a pixel in which occlusion is not caused (occlusion is absent). Then, the occlusion information calculation unit 202 generates occlusion information for the target pixel 701, which indicates that occlusion is present or that occlusion is absent.

As processing at next S605, the occlusion information calculation unit 202 judges whether or not occlusion information has been calculated for all the pixels in the target images. In a case of judging at S605 that occlusion information has not been calculated for all the pixels (No), the occlusion information calculated unit 202 returns the procedure to the processing of S601, and performs the processing of S601 to S604 for a pixel occlusion information of which has not been calculated. Then, in the case of judging at S605 that occlusion information has been calculated for all the pixels (Yes), the occlusion information calculation unit 202 ends the processing of the flowchart of FIG. 6. Note that, the occlusion information calculation unit 202 may not calculate occlusion information for all the pixels and may calculate occlusion information for each predetermined pixel. The occlusion information that has been calculated for all the pixels as described above is sent to the RAM 103 and temporarily stored therein.

<Motion Information Estimation Processing of Occlusion Region>

Description is returned to the flowchart of FIG. 3.

Processing at S303 of FIG. 3 is performed by the motion information estimation unit 203. At S303, the motion information estimation unit 203 estimates motion information of an occlusion region by using the forward motion information, the backward motion information, and the occlusion information that are stored in the RAM 103. The occlusion region is a region of a pixel in which occlusion is present. Then, the motion information estimation unit 203 outputs the estimated motion information of the occlusion region to the image interpolation processing unit 204.

Hereinafter, motion information estimation processing of the occlusion region, which is performed by the motion information estimation unit 203 at S303 of FIG. 3, will be described in detail by using FIG. 8A to FIG. 8G.

Among a plurality of frame images that are continuous on a time axis of a motion image, FIG. 8B illustrates a part of an Nth image (N image), FIG. 8C illustrates a part of an (N+1)th image (N+1 image), and FIG. 8A illustrates a part of an (N−1)th image (hereinafter, referred to as an N−1 image) that is temporally previous to the N image. Moreover, it is set that a target pixel 801 in FIG. 8A and FIG. 8B indicates a pixel of a moving object area, while an object area 800 of FIG. 8A to FIG. 8C indicates an image area of an object that does not move and exists on a closer side than the object area of the target pixel 801. Since the target pixel 801 of FIG. 8A and FIG. 8B moves to the right with a lapse of time, in the N+1 image of FIG. 8C, the target pixel (801) is in a state of being hidden by the object area 800 and not being seen (occlusion is present).

FIG. 8D illustrates, among pieces of backward motion information stored in the RAM 103, backward motion information 810 that is calculated for the target pixel 801 of FIG. 8B by setting the N image as a standard image and the N−1 image as a reference image. As illustrated in FIG. 8A and FIG. 8B, since the target pixel 801 is not hidden by the object area 800 in the N−1 image or the N image, the backward motion information 810 is able to be calculated with high accuracy as illustrated in FIG. 8D. In the case of FIG. 8D, the backward motion information 810 is calculated as X: −1 and Y: 0. Note that, although not illustrated in FIG. 8D, forward motion information between the N−1 image of FIG. 8A and N image of FIG. 8B is also able to be calculated.

On the other hand, FIG. 8E illustrates a view for explaining a case where, among pieces of forward motion information stored in the RAM 103, motion information of the target pixel 801 of FIG. 8B is calculated by setting the N image as a standard image and the N+1 image as a reference image. However, as illustrated in FIG. 8C, since the target pixel (801) is hidden by the object area 800 in the N+1 image, there is a high possibility that the forward motion information is not able to be calculated as illustrated in FIG. 8E or that, even when being calculated, the motion information is not correct. That is, in this case, motion information of an occlusion region is not able to be calculated. Note that, although not illustrated in FIG. 8E, there is also a high possibility that backward motion information between the N image of FIG. 8B and the N+1 image of FIG. 8C is also not able to be calculated or that, even when being calculated, the motion information is not correct.

Thus, in a case where occlusion that the target pixel (801) is hidden by the object area 800 is caused, the motion information estimation unit 203 estimates motion information of the occlusion region in a manner as illustrated in FIG. 8F and FIG. 8G. That is, the motion information estimation unit 203 estimates, on the basis of the backward motion information that is calculated with high accuracy as illustrated in FIG. 8D, the forward motion information that is for the occlusion region in which the target pixel (801) is hidden by the object area 800 and is therefore not able to be calculated. Specifically, by using the backward motion information that is correctly calculated for the target pixel 801 of the N image illustrated in FIG. 8B, the motion information estimation unit 203 estimates, as motion information of the occlusion region, motion information that is obtained by inverting a direction (that is, a sign) of the backward motion information. FIG. 8F illustrates a target pixel 820 for which the correct backward motion information 810 as illustrated in FIG. 8D is calculated since occlusion is not caused as in the example of FIG. 8A and FIG. 8B. The motion information estimation unit 203 sets, as the forward motion information estimated for the target pixel 820, information that is obtained by inverting a positive or a negative of X: −1 and Y: 0 of the backward motion information 810 calculated for the target pixel 820, that is, X: +1 and Y: 0 that are obtained by inverting the negative of X: −1. Thereby, as illustrated in FIG. 8G, forward motion information 811 that is estimated for the target pixel 801 of the N image in FIG. 8B is obtained. As above, in the case of the present exemplary embodiment, the motion information estimation unit 203 estimates the motion information 811 of the occlusion region in which the target pixel 801 is hidden by the object area 800. Then, the estimated forward motion information of the occlusion region is sent to the RAM 103 and temporarily stored therein.

<Image Interpolation>

Description is returned to the flowchart of FIG. 3.

Processing at S304 of FIG. 3 is performed by the image interpolation processing unit 204. At S304, the image interpolation processing unit 204 generates an interpolation image between the target images by using data of the target images read out from the recording unit 108 and the forward motion information (the motion information that is able to be calculated at S302 and the motion information that is estimated at S303) stored in the RAM 103. Then, the image interpolation processing unit 204 outputs image data subjected to image interpolation processing.

Hereinafter, the image interpolation processing performed by the image interpolation processing unit 204 at S304 of FIG. 3 will be described in detail by using FIG. 9 and the following drawings.

Figure 9:
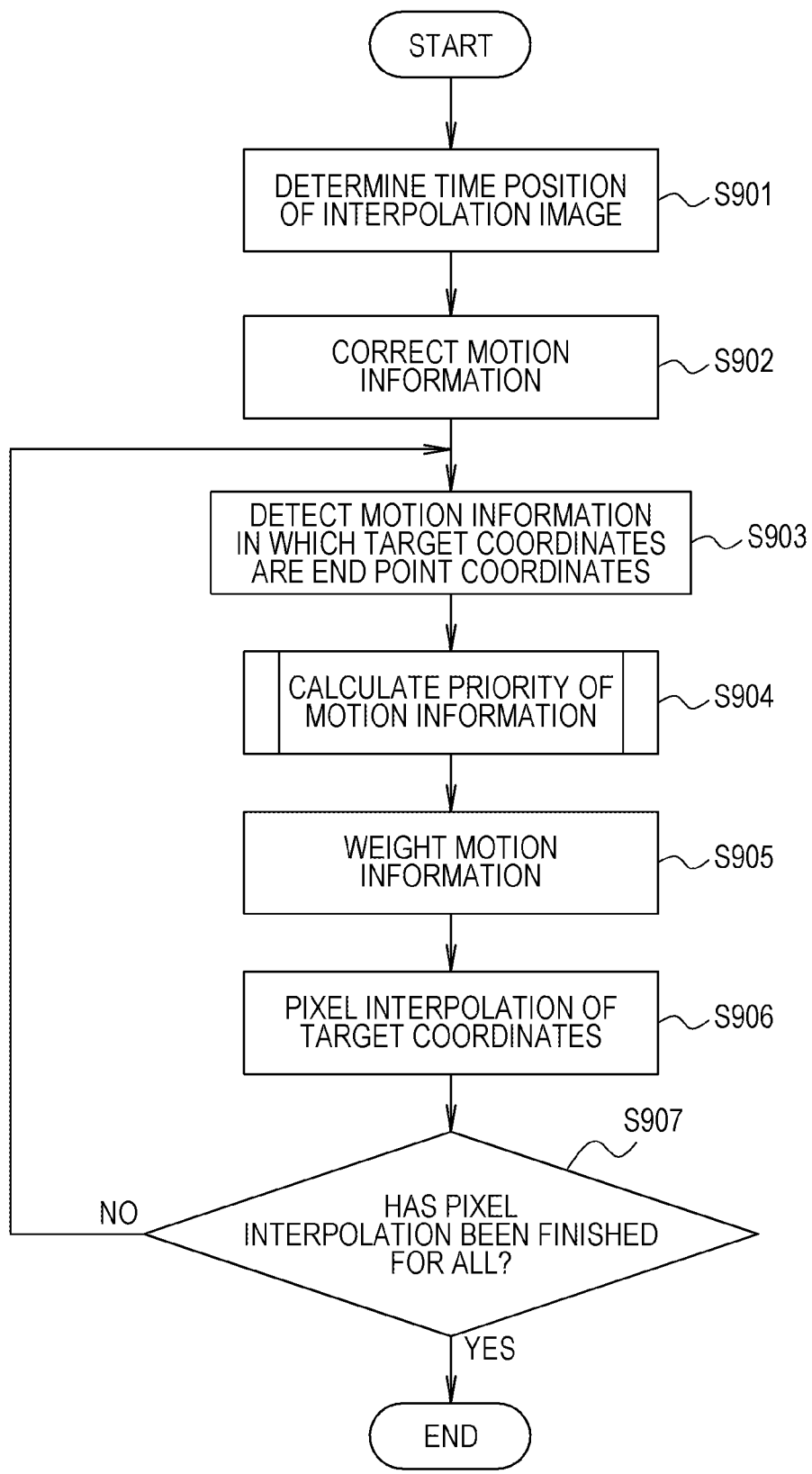
FIG. 9 is a flowchart of image interpolation processing.

FIG. 9 is a detailed flowchart of the image interpolation processing performed by the image interpolation processing unit 204 at S304 of FIG. 3. FIG. 10A to FIG. 10E are views used for explaining the processing of the flowchart of FIG. 9.

Figure 10A:
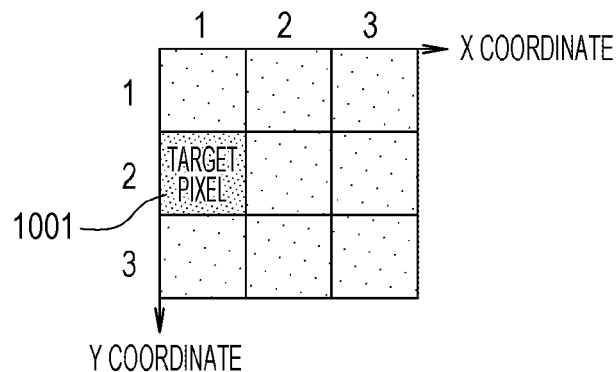
FIGS. 10A to 10E illustrate views for explaining correction processing of motion information.
Figure 10B:
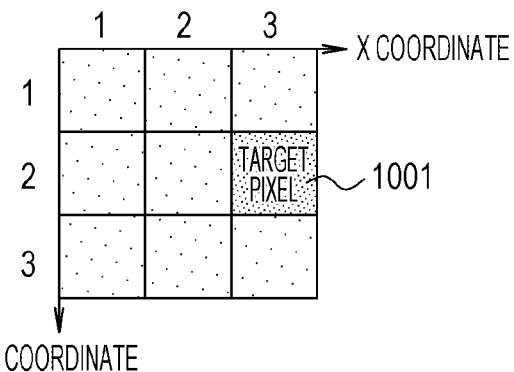

Among a plurality of frame images that are continuous on a time axis of, for example, a motion image, FIG. 10A illustrates a part of an Nth image (N image) that is a target of the image interpolation processing and FIG. 10B illustrates a part of an (N+1)th image (N+1 image) that comes after the N image. Moreover, a target pixel 1001 of the image interpolation processing is a pixel whose coordinates are (1, 2) in the N image illustrated in FIG. 10A, and it is set that, in the next N+1 image, the target pixel 1001 moves to a position whose coordinates are (3, 2) as illustrated in FIG. 10B.

Figure 10C:
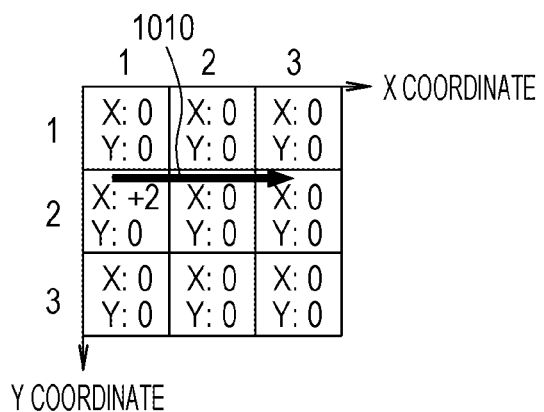
Figure 10D:
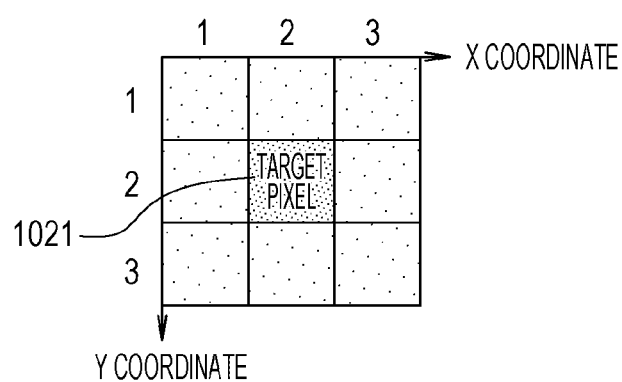
Figure 10E:
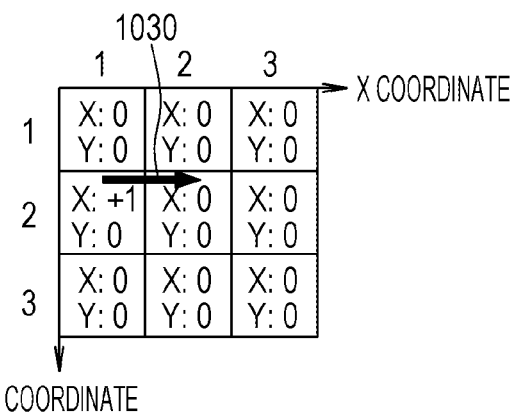

FIG. 10C illustrates an example of motion information 1010 that is calculated when, in a case where there is motion information that is not able to be calculated since a target pixel is hidden by an object area on a closer side as described above, the motion information estimation unit 203 performs the estimation processing. In the case of FIG. 10C, it is assumed that the motion information 1010 of X: +2 and Y: 0 is estimated (calculated) for the coordinates (1, 2) on the basis of the N image of FIG. 10A and the N+1 image of FIG. 10B. FIG. 10E illustrates corrected motion information 1030 in which gain processing described below is applied to the estimated motion information 1010 of FIG. 10C. The corrected motion information 1030 illustrated in FIG. 10E is motion information used at a time of generating a target pixel 1021 in an interpolation image of FIG. 10D. FIG. 10D illustrates a part of the interpolation image that is generated on the basis of the N image of FIG. 10A and the N+1 image of FIG. 10B. The target pixel 1021 in FIG. 10D indicates an interpolation pixel that is generated, by using the corrected motion information 1030 illustrated in FIG. 10E, as a pixel with which interpolation between the target pixel 1001 of FIG. 10A and the target pixel 1001 of FIG. 10B is performed.

At S901 of FIG. 9, the image interpolation processing unit 204 determines a position, on a time axis, of the interpolation image that performs interpolation between the target images of the image interpolation processing. In the example of FIG. 10A and FIG. 10B, in a case where a time interval between the target images of the N image and the N+1 image is indicated as "1", the image interpolation processing unit 204 determines, as a time position of the interpolation image, a position which is, on the time axis, a "½" time interval after the N image. Note that, the interpolation image illustrated in FIG. 10D indicates an interpolation image at the position which is, on the time axis, the "½" time interval after the Nth image.

Next, at S902, the image interpolation processing unit 204 performs, for the motion information estimated at S303 of FIG. 3, gain processing corresponding to the position of the interpolation image on the time axis, which is determined at S901. In the case of the present exemplary embodiment, the position which is, on the time axis, the "½" time interval after the N image is set as the time position of the interpolation image, and the gain processing corresponding to the position of the interpolation image on the time axis is gain processing by which the motion information estimated at S303 is multiplied by ½. In a case where the estimated motion information is the motion information 1010 indicating X: +2 and Y: 0 at the start point coordinates (1, 2), which is illustrated in FIG. 10C, the corrected motion information by the gain processing is the motion information 1030 indicating X: +1 and Y: 0 at the start point coordinates (1, 2), which is illustrated in FIG. 10E.

Figure 11:
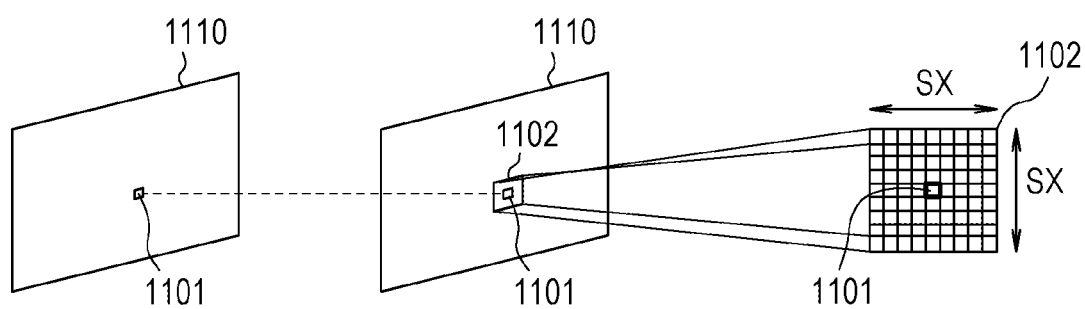
FIG. 11 illustrates a view for explaining detection processing of motion information in which target coordinates are end point coordinates.

Next, at S903, with respect to coordinates (referred to as target coordinates 1101) of a target pixel in a target image 1110, the image interpolation processing unit 204 sets a range which is around the coordinates and whose pixel numbers in a vertical direction and a horizontal direction are both SX as a search range 1102 as illustrated in FIG. 11.

Then, among a plurality of pieces of motion information included in the search range 1102, the image interpolation processing unit 204 detects motion information in which the target coordinates 1101 are end point coordinates. Not only one but a plurality of (that is, one or more) pieces of motion information, in each of which the target coordinates 1101 are end point coordinates, are detected in some cases. Note that, although an example in which the image interpolation processing unit 204 detects, in the search range 1102, motion information in which end point coordinates are coincident with the target coordinates 1101 is cited here, there is no limitation thereto. For example, the image interpolation processing unit 204 may detect motion information in which end point coordinates are included in a predetermined coordinate range in which the target coordinates 1101 are set in the center. Also in this case, one or more pieces of motion information, in each of which end point coordinates are included in the predetermined coordinate range in which the target coordinates 1101 are set in the center are detected in some cases.

<Priority Calculation Processing of Motion Information>

Next, at S904, the image interpolation processing unit 204 calculates priority for each motion information detected at S903.

Hereinafter, priority calculation processing of motion information, which is performed by the image interpolation processing unit 204 at S904 of FIG. 9, will be described in detail by using drawings of FIG. 12 to FIG. 14. FIG. 12 is a detailed flowchart of the priority calculation processing of motion information, which is performed by the image interpolation processing unit 204 at S904 of FIG. 9. FIG. 13A to FIG. 13D are views for explaining calculation processing of moving source coordinates and moving destination coordinates of motion information, which is performed at S1202 of FIG. 12. FIG. 14 illustrates an example of a table used for judgment processing of priority of motion information, which is performed at S1204 of FIG. 12 described below.

FIG. 13A illustrates a part of the above-described N image which is the target of the image interpolation processing, and FIG. 13B illustrates a part of the N+1 image which comes after the N image. Moreover, a target pixel 1301 of the image interpolation processing is a pixel whose coordinates are (1, 2) in the N image illustrated in FIG. 13A, and it is set that, in the next N+1 image, the target pixel 1301 moves to a position whose coordinates are (3, 2) as illustrated in FIG. 13B. Note that, in an example of FIG. 13A, FIG. 13B, and FIG. 13D, it is set that a position of an entire image moves to the left by an amount of one pixel between the N image and the N+1 image, for example, due to panning of the image capturing apparatus 100 at a time of capturing the image.

FIG. 13C illustrates motion information in the N image, which has been estimated at S303 of FIG. 3 described above, further corrected at S902 of FIG. 9, and thereafter detected at S903 of FIG. 9 and in which the target coordinates are end point coordinates. In this case, as illustrated in FIG. 13A and FIG. 13B, the target pixel 1301 is at the coordinates (1, 2) in the N image, and moves to the position of the coordinates (3, 2) in the N+1 image. On the other hand, as illustrated in FIG. 13C, since the entire image is moved to the left by the amount of one pixel between the N image and the N+1 image, for example, due to panning of the image capturing apparatus 100, motion information at coordinates other than those of the target pixel 1301 indicates X: −1 and Y: 0. That is, in the motion information illustrated in FIG. 13C, motion information of coordinates (1, 2), which corresponds to the target pixel 1301 of FIG. 13A, indicates X: +2 and Y: 0, and motion information at coordinates other than those of the target pixel 1301 indicates X: −1 and Y: 0. FIG. 13D illustrates moving source coordinates 1321 and moving destination coordinates 1322 of the target pixel 1301, which are calculated in a manner described below by using the motion information illustrated in FIG. 13C.

At S1201 of FIG. 12, the image interpolation processing unit 204 acquires the plurality of (one or more) pieces of motion information, which have been detected at S903 of FIG. 9 and in each of which the target coordinates are end point coordinates.

Next, at S1202, the image interpolation processing unit 204 calculates the moving source coordinates 1321 and the moving destination coordinates 1322 of the motion information acquired at S1201. Here, the moving source coordinates 1321 of the motion information are pixel coordinates of the target pixel 1301 in the N image of FIG. 13A. In the case of the example of FIG. 13A, the coordinates of the target pixel 1301 in the N image are (1, 2), so that the moving source coordinates 1321 is coordinates (1, 2) as illustrated in FIG. 13D. The moving destination coordinates 1322 are coordinates in the N image of FIG. 13A, which are at the same coordinates as those of the target pixel 1301 in the N+1 image of FIG. 13B. The image interpolation processing unit 204 calculates end point coordinates (3, 2) on the basis of X: +2 of motion information at the moving source coordinates 1321 (1, 2) as illustrated in FIG. 13C. At this time, though motion information calculated at the end point coordinates (3, 2) indicates X: −1 and Y: 0, the motion information in which X: −1 and Y: 0 are indicated is motion information calculated in a state where the entire image moves to the left, for example, due to panning of the image capturing apparatus 100, so that the image interpolation processing unit 204 calculates, for the motion information of X: −1 and Y: 0 at the end point coordinates (3, 2), coordinates (4, 2) as the moving destination coordinates 1322 on the basis of X: +1 and Y: 0 which are obtained, for example, by inverting a sign so as to cancel an amount of the movement of the entire image, which is caused due to panning or the like.

Next, at S1203, by using the occlusion information calculated at S302 of FIG. 3, the image interpolation processing unit 204 acquires information of presence or absence of occlusion, which corresponds to the moving source coordinates 1321 and the moving destination coordinates 1322 that have been calculated at S1202. The occlusion information is information in which presence of occlusion or absence of occlusion is set for each pixel as described above, and presence or absence of occlusion is set also for each of the moving source coordinates 1321 and the moving destination coordinates 1322 as indicated in FIG. 14.

Furthermore, at S1204, on the basis of the information of presence or absence of occlusion, which corresponds to the moving source coordinates 1321 and the moving destination coordinates 1322 and has been calculated at S1203, the image interpolation processing unit 204 judges priority of motion information by using the table illustrated in FIG. 14. The table in FIG. 14 indicates correspondence between presence or absence of occlusion, which corresponds to the moving source coordinates 1321 and the moving destination coordinates 1322, and priority 1 to priority 4 each of which indicates a level of priority. For example, in a case where occlusion is absent at both the moving source coordinates 1321 and the moving destination coordinates 1322, the highest priority 1 is provided, and, in a case where occlusion is absent at the moving source coordinates 1321 and occlusion is present at the moving destination coordinates 1322, the priority 2 is provided. Moreover, for example, in a case where occlusion is present at the moving source coordinates 1321 and occlusion is absent at the moving destination coordinates 1322, the priority 3 is provided, and, in a case where occlusion is present at both the moving source coordinates 1321 and the moving destination coordinates 1322, the lowest priority 4 is provided.

After S1204, the image interpolation processing unit 204 judges at S1205 whether or not judgment of priority has been finished for all the pieces of motion information, which had been detected at S903 of FIG. 9. In the case of judging at S1205 that judgment of priority has not been finished for all the pieces of motion information (No), the image interpolation processing unit 204 returns the procedure to the processing of S1202, and performs the processing of S1202 to S1204 for motion information for which judgment has not been made. In the case of judging at S1205 that judgment of priority has been finished for all the pieces of motion information (Yes), the image interpolation processing unit 204 ends the processing of the flowchart of FIG. 12. The image interpolation processing unit 204 performs judgment of priority in the above-described manner.

Description is returned to the flowchart of FIG. 9.

At S905 of FIG. 9, the image interpolation processing unit 204 weights each motion information on the basis of the priority of the motion information, which has been calculated at S904. For example, the image interpolation processing unit 204 performs weighting in such a manner that a weigh is set as 1 for the motion information whose priority is the highest priority 1 and a weight is set as "0" for the other motion information whose priority is the priority 2 to the priority 4. Moreover, in a case where there are a plurality of pieces of motion information, priority of each of which is the highest priority 1, the image interpolation processing unit 204 may set weights each having any numerical value so that a sum of the weights of the plurality of pieces of motion information, the priority of which is the priority 1, becomes "1". In addition, the image interpolation processing unit 204 may weigh each of one or more pieces of motion information so as to use the one or more pieces of motion information for image interpolation processing, on the basis of the above-described priority of the motion information.

Figure 15A:
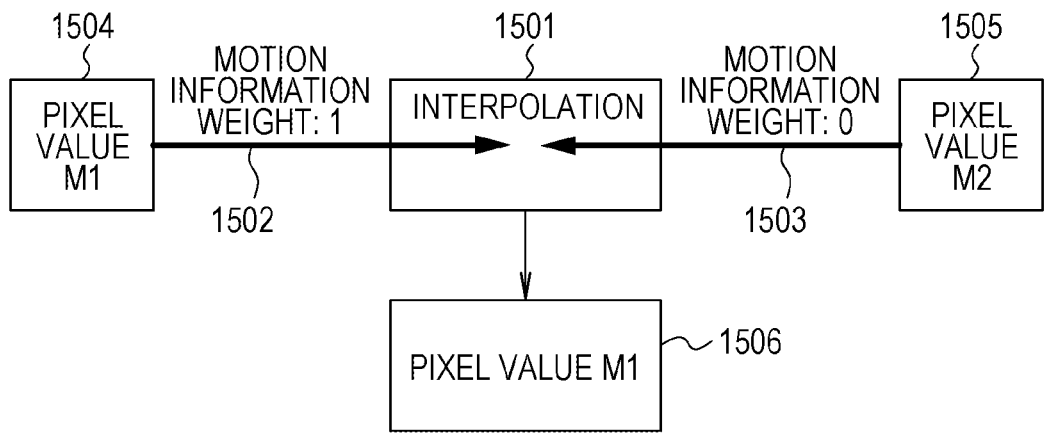
FIGS. 15A and 15B illustrate views for explaining pixel interpolation processing of target coordinates.
Figure 15B:
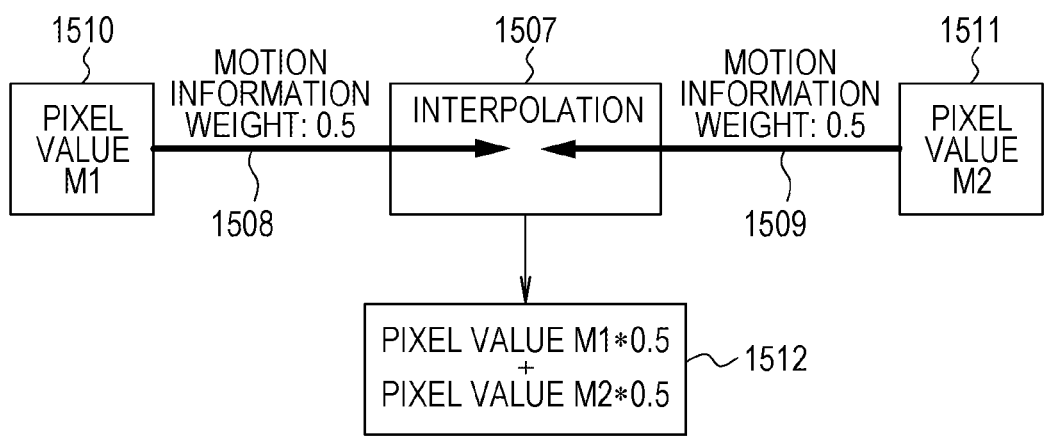

Next, at S906, the image interpolation processing unit 204 performs pixel interpolation processing by using the motion information weighted at S905. FIG. 15A and FIG. 15B are views each illustrating an example of the pixel interpolation processing. FIG. 15A illustrates the example where an interpolation pixel 1506 is generated by pixel interpolation processing 1501 in which motion information 1502 having a weight of "1" is used for a pixel 1504 having a pixel value M1 and motion information 1503 having a weight of "0" is used for a pixel 1505 having a pixel value M2. FIG. 15A illustrates the example in which, for example, the weight is set as 1 for motion information whose priority is the highest priority 1 and the weight is set as "0" for the other motion information whose priority is the priority 2 to the priority 4. In the case of the example of FIG. 15A, the pixel 1504 having the pixel value M1 becomes the interpolation pixel 1506, and pixel interpolation of target coordinates is performed with the interpolation pixel 1506 having the pixel value M1. FIG. 15B illustrates the example where an interpolation pixel 1512 is generated by pixel interpolation processing 1507 in which motion information 1508 having a weight of "0.5" is used for a pixel 1510 having the pixel value M1 and motion information 1509 having a weight of "0.5" is used for a pixel 1511 having the pixel value M2. FIG. 15B illustrates the example in which weighting is performed for each of one or more pieces of motion information so as to use the one or more pieces of motion information for the image interpolation processing. In the case of the example of FIG. 15B, a pixel having a pixel value of (M1×0.5)+(M2×0.5) becomes the interpolation pixel 1512, and pixel interpolation of target coordinates is performed with the interpolation pixel 1512.

Next, at S907, the image interpolation processing unit 204 judges whether or not pixel interpolation has been finished for all target coordinates. In the case of judging at S907 that pixel interpolation has not been finished for all the target coordinates (No), the image interpolation processing unit 204 returns the procedure to the processing of S903 and performs the processing of S903 to S906 for the target coordinates for which pixel interpolation has not been finished. In the case of judging at S907 that pixel interpolation has been finished for all the target coordinates (Yes), the image interpolation processing unit 204 ends the processing of the flowchart of FIG. 9. The image interpolation processing unit 204 generates an interpolation image in the above-described manner.

As described above, in the image capturing apparatus 100 of the present exemplary embodiment, priority of motion information is calculated on the basis of the motion information and occlusion information, and image interpolation processing using appropriate motion information which is obtained by performing weighting on the basis of the priority is performed. Thereby, according to the image capturing apparatus 100 of the present exemplary embodiment, it is possible to realize image processing by which an interpolation image having excellent image quality is able to be generated.

Note that, although the image interpolation processing using weighted motion information has been taken in the above-described exemplary embodiment as an example of image processing, the invention is applicable also to other various types of image processing that uses motion information. Examples of the other types of image processing include, for example, filtering processing, alignment processing, and motion blur adding processing.

Other Exemplary Embodiments

As above, although the exemplary embodiment of the invention has been described, the invention is not limited to the exemplary embodiment, and may be variously modified or changed within a range of the gist.

The invention is able to be realized by processing in which a program that realizes one or more functions of the aforementioned exemplary embodiment is supplied to a system or an apparatus via a network or a storage medium and one or more processors in a computer of the system or the apparatus reads out and executes the program. Moreover, the invention is able to be realized also by a circuit (for example, an ASIC) that realizes one or more functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Any of the above-described exemplary embodiments are merely specific examples in which the invention is implemented, and a technical range of the invention shall not be limitedly interpreted thereby. That is, the invention may be implemented in various manners without departing from technical idea or principal features thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-070554 filed Mar. 31, 2017, which is hereby incorporated by reference herein in its entirety.

What is claimed is:

1. An image processing apparatus comprising:
   at least one memory configured to store instructions; and
   at least one processor in communication with the at least one memory and configured to execute the instructions to function as:
   an acquisition unit configured to acquire motion information between a plurality of target images;
   a generation unit configured to generate occlusion information between the target images;
   a determination unit configured to determine a priority of the motion information based on the motion information and the occlusion information; and
   a processing unit configured to perform predetermined image processing for the target images by using motion information that is weighted based on the priority,
   wherein the priority is determined in a following order:
   where the occlusion information corresponding to moving source coordinates indicates absence of occlusion and the occlusion information corresponding to moving destination coordinates indicates presence of occlusion,
   where the occlusion information corresponding to the moving source coordinates indicates presence of occlusion and the occlusion information corresponding to the moving destination coordinates indicates absence of occlusion, and
   where the occlusion information corresponding to both the moving source coordinates and the moving destination coordinates indicates presences of occlusion.

2. The image processing apparatus according to claim 1, wherein the acquisition unit acquires motion information between two of the target images that are continuous on a time axis.

3. The image processing apparatus according to claim 1, wherein the acquisition unit calculates the motion information based on a correlation value between the target images.

4. The image processing apparatus according to claim 1, wherein the generation unit
calculates first motion information of the acquired motion information between the target images by setting a first target image of the plurality of target images as a standard image and a second target image of the plurality of target images after the first target image on a time axis as a first reference image and using the standard image and the first reference image,
calculates second motion information of the acquired motion between the target images by setting the first target image as the standard image and a third target image before the first target image on the time axis as a second reference image and using the standard image and the second reference image, and
generates the occlusion information based on the first motion information and the second motion information.

5. The image processing apparatus according to claim 4, wherein the generation unit generates the occlusion information indicating that occlusion is caused in a case where a distance between start point coordinates based on the first motion information and end point coordinates based on the second motion information is equal to or more than a threshold.

6. The image processing apparatus according to claim 1, wherein the at least one processor further functions as an estimation unit configured to estimate motion information of a region in which occlusion is caused between the target images by using motion information that is acquired between the target images different from the target images between which the occlusion is caused.

7. The image processing apparatus according to claim 6, wherein the estimation unit calculates, as the motion information of the region in which the occlusion is caused, information obtained by inverting a positive sign or a negative sign of motion information that is calculated by setting a target image after another target image, which is set as a reference image, on a time axis as a standard image.

8. The image processing apparatus according to claim 6, wherein the processing unit performs the predetermined image processing for the target images by using the motion information that is estimated by the estimation unit and weighted based on the priority.

9. The image processing apparatus according to claim 1, wherein the determination unit determines the priority of the motion information based on the occlusion information corresponding to the moving source coordinates and the moving destination coordinates that are calculated from the motion information between the target images.

10. The image processing apparatus according to claim 9, wherein the occlusion information is information indicating presence of occlusion in a case where occlusion is caused or absence of occlusion in a case where occlusion is not caused, and the determination unit determines highest priority in a case where both of two pieces of occlusion information respectively corresponding to the moving source coordinates and the moving destination coordinates indicate absence of occlusion.

11. The image processing apparatus according to claim 1, wherein, in a case where there are a plurality of pieces of motion information each having highest priority, the processing unit sets a sum of weights of the plurality of pieces of motion information at a predetermined value.

12. The image processing apparatus according to claim 1, wherein the processing unit performs the weighting to use, for the predetermined image processing, one or more pieces of motion information based on the priority of the motion information.

13. The image processing apparatus according to claim 1, wherein the determination unit detects, in a search range including target coordinates in the target images, one or more pieces of the motion information in each of which the target coordinates are end point coordinates and determines the priority for each of the detected one or more pieces of motion information.

14. The image processing apparatus according to claim 1, wherein the processing unit generates an interpolation image between the target images as the predetermined image processing.

15. An image processing method of an image processing apparatus, the method comprising:
acquiring motion information between a plurality of target images;
generating occlusion information between the target images;
determining a priority of the motion information based on the motion information and the occlusion information; and
performing predetermined image processing for the target images by using motion information that is weighted based on the priority, wherein the priority is determined in a following order:
where the occlusion information corresponding to moving source coordinates indicates absence of occlusion and the occlusion information corresponding to moving destination coordinates indicates presence of occlusion)
where the occlusion information corresponding to the moving source coordinates indicates presence of occlusion and the occlusion information corresponding to the moving destination coordinates indicates absence of occlusion, and
where the occlusion information corresponding to both the moving source coordinates and the moving destination coordinates indicates presences of occlusion.

16. A non-transitory storage medium storing a program that causes a computer to execute a method, the method comprising:
acquiring motion information between a plurality of target images;
generating occlusion information between the target images;
determining a priority of the motion information based on the motion information and the occlusion information; and
performing predetermined image processing for the target images by using motion information that is weighted based on the priority, wherein the priority is determined in a following order:
where the occlusion information corresponding to moving source coordinates indicates absence of occlusion and the occlusion information corresponding to moving destination coordinates indicates presence of occlusion)
where the occlusion information corresponding to the moving source coordinates indicates presence of occlusion and the occlusion information corresponding to the moving destination coordinates indicates absence of occlusion, and where the occlusion information corresponding to both the moving source coordinates and the moving destination coordinates indicates presences of occlusion.

* * * * *